(12) United States Patent
Fahy

(10) Patent No.: US 7,274,124 B2
(45) Date of Patent: Sep. 25, 2007

(54) ELECTRIC GENERATOR

(75) Inventor: Arthur James Fahy, Helenburgh (AU)

(73) Assignee: Quantum Generation Pty Limited, Sydney NSW (AU)

( * ) Notice: Subject to any disclaimer, the term of this patent is extended or adjusted under 35 U.S.C. 154(b) by 364 days.

(21) Appl. No.: 10/501,340

(22) PCT Filed: Jan. 25, 2002

(86) PCT No.: PCT/AU02/00081

§ 371 (c)(1),
(2), (4) Date: Feb. 3, 2005

(87) PCT Pub. No.: WO02/060035

PCT Pub. Date: Aug. 1, 2002

(65) Prior Publication Data

US 2005/0116569 A1    Jun. 2, 2005

(30) Foreign Application Priority Data

Jan. 25, 2001    (AU)    .................... PR2691

(51) Int. Cl.
*H02K 21/26* (2006.01)
(52) U.S. Cl. ................. 310/154.1; 310/80; 310/103
(58) Field of Classification Search .......... 310/80, 310/101, 103, 109, 171, 190, 268; 290/1 R
See application file for complete search history.

(56) References Cited

U.S. PATENT DOCUMENTS 2,481,196 A * 9/1949 Bulliet ................ 324/163
3,967,146 A * 6/1976 Howard ................ 310/80
4,266,180 A * 5/1981 Juvan ................ 322/4

(Continued)

FOREIGN PATENT DOCUMENTS

AU    33154/99 B    12/1999

(Continued)

OTHER PUBLICATIONS

John C. Bedini, "The Bedini Free Energy Generator", Institute of Electrical and Electronics Engineers, Proceedings of the Intersociety Energy Conversion Engineering Conference (IECEC), vol. 4, Conference 26, Aug. 4, 1991, pp. 451-456.

*Primary Examiner*—Thanh Lam
(74) *Attorney, Agent, or Firm*—Arent Fox LLP

(57) ABSTRACT

The present invention discloses a generator (1) able to generate either unidirectional current or bi-directional current. A rotatable disc (7) has a conductive track (9) and a ferromagnetic bridge (8). Brushes (12, 13) switchingly open circuit a coil (16) or connect the coil (16) to a load resistor (R). Movement of the disc (7) results in bridge (8) shunting a core (15) of the coil (16). This generates an emf in the coil (16). If the circuit is closed, current flows in the resistor (R). If the circuit is open, no current flows. The arrangement is such that current only flows when the bridge (8) approaches the magnet (14)—not when the bridge (8) recedes from the magnet (14). Thus, only the magnetic attraction for the bridge (8) by the magnet (14) impedes the movement of the disc (7) as the bridge (8) recedes from the magnet (14) without the disc's movement also being impeded by generation of electric current at that time.

28 Claims, 3 Drawing Sheets

U.S. PATENT DOCUMENTS 4,511,777 A * 4/1985 Gerard ................ 219/631
5,945,762 A * 8/1999 Chen et al. ............ 310/171
6,657,351 B2 * 12/2003 Chen et al. ............ 310/171

FOREIGN PATENT DOCUMENTS

| DE | 44 42 283 A1 | 5/1996 |
| --- | --- | --- |
| EP | 0 462 340 A1 | 12/1991 |
| EP | WO96/09680 A | 3/1996 |
| GB | 2 111 318 A | 6/1983 |

\* cited by examiner

ELECTRIC GENERATOR

CROSS-REFERENCE TO RELATED APPLICATION

This application is a National Stage entry of International Application No. PCT/AU02/00081, filed Jan. 25, 2002, the entire specification claims and drawings of which are incorporated herewith by reference.

FIELD OF THE INVENTION

The present invention relates to electric devices including generators which generate an electric current and electric motors.

BACKGROUND ART

Most electrical devices include a magnetic field and a magnetically permeable structure which are involved in relative movement. During that movement there is normally a symmetrical motion in which magnetic repulsion during one part of the motion is disadvantageous and magnetic retardation during another part of the motion is also disadvantageous.

The object of the present invention is to provide both an electrical device and a method of generating an electric current in which the disadvantageous magnetic retardation is reduced.

SUMMARY OF THE INVENTION

In accordance with a first aspect of the present invention there is disclosed a method of generating an electric current, said method comprising the steps of:
1. creating a magnetic field extending from a first magnetic pole to a second magnetic pole,
2. creating a first magnetically permeable path extending from adjacent said first magnetic pole to adjacent said second magnetic pole,
3. winding a coils about said first magnetic path,
4. connecting an electrical load across said coil,
5. connecting a switch means in series with said coil,
6. enabling a second magnetically permeable path to move relative to said poles into a position between said first and second magnetic poles to shunt said first magnetic path,
7. moving said second magnetically permeable path relative to said poles out of said position between said first and second magnetic poles, and
8. opening and closing said switch means so that said switch means is closed when said second magnetic path is moving into said position and opened when said second magnetic path is moving out of said position.

In accordance with a second aspect of the present invention here is disclosed an electrical device comprising a magnetic field means having first and second magnetic poles between which a magnetic field extends, a first magnetically permeable path carrying a coil and extending from adjacent said first magnetic pole to adjacent said second magnetic pole, and switch means connected in series with said coil, a second magnetically permeable path mounted for movement relative to said poles into and out of a position between said first and second magnetic poles in which said second path shunts said first path, and means to close said switch means as said second path moves towards said position and open said switch means as said second path moves out of said position.

BRIEF DESCRIPTION OF THE DRAWING

Two embodiments of the present invention will now be described with reference to the drawings in which.

DETAILED DESCRIPTION

Figure 1:
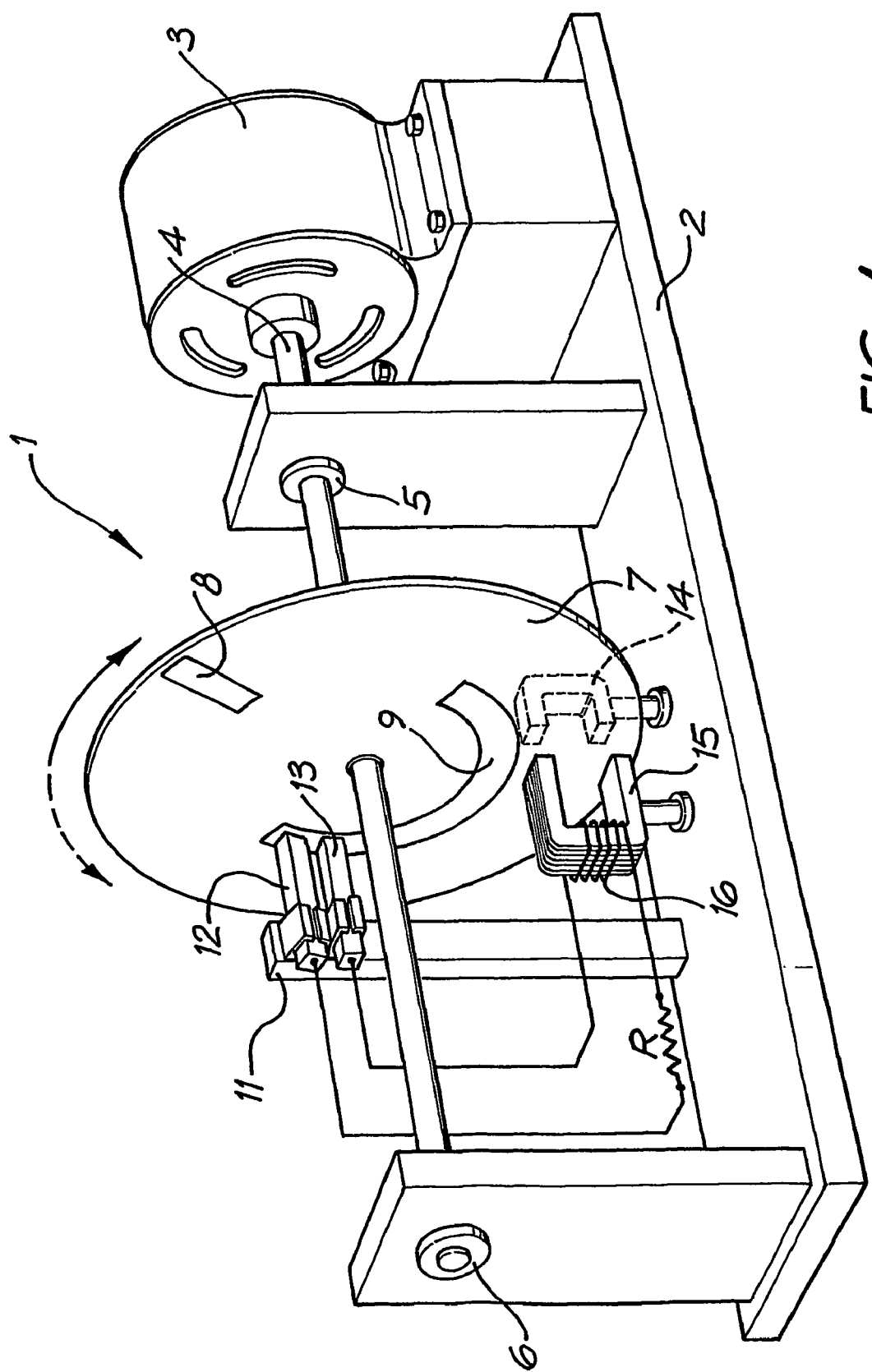
FIG. 1 is a perspective, view of a single coil generator in accordance with a fist embodiment of the present invention.

As seen in FIG. 1, a first embodiment of a generator 1 has a base plate 2 on which is mounted a prime mover in the form of an electric motor 3. Clearly any other form of prime mover such as an internal combustion engine, turbine, hydraulic motor, or the like will suffice. The motor 3 has a shaft 4 which is supported by bearings 5, 6.

Figure 2:
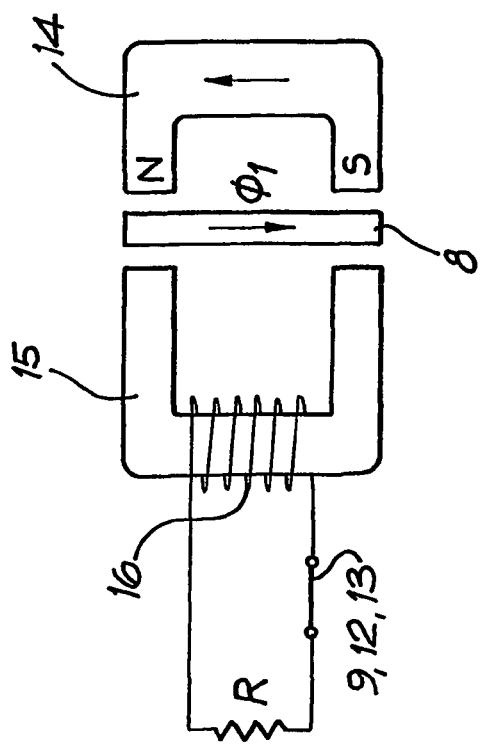
FIG. 2 is a schematic magnetic circuit diagram and current waveform illustrating a first half cycle of operation of the apparatus of FIG. 1.
Figure 2:
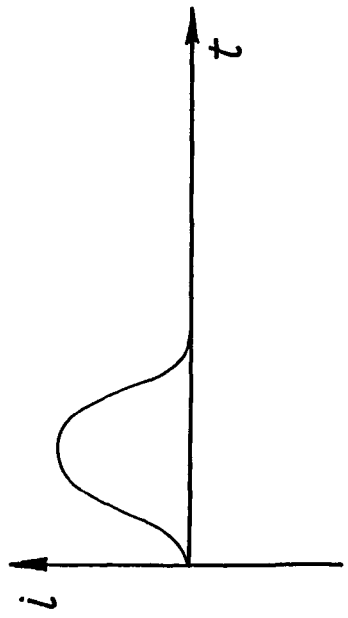

An insulative, non-permeable disc 7 is mounted on the shaft 4 for rotation therewith. Set into the disc 7 is a ferromagnetic bridge 8 and a curved conductive track 9. Mounted on an insulative support 11 are a pair of carbon brushes 12, 13. Mounted to the rear side of the disc 7, and thus indicated by broken lines in FIG. 1, is a U-shaped permanent magnet 14 having a north pole N and a south pole S (FIG. 2). Opposite the magnet 14 is a U-shaped magnetically permeable core 15 formed from steel laminations or the like and upon which is wound a coil 16.

The coil 16, brushes 12, 13 and an electrical load in the form of resistor R are connected in series. It will be apparent to those skilled in the art that the track 9 and brushes 12, 13 function as a rotary switch which open circuits the the coil 16 or connects the resistor R across it in accordance with the position of the disc 7. The track 9 and brushes 12, 13 are so arranged that the coil 16 is connected to the resistor R whilst the bridge 8 is approaching the core 15 and whilst the bridge 8 and core 15 are aligned. However, as the bridge 8 begins to leave the core 15 with continued rotation of the disc 7, the brushes 12, 13 are open circuited by the departure of the track 9 from underneath the brushes 12, 13.

Figure 3:
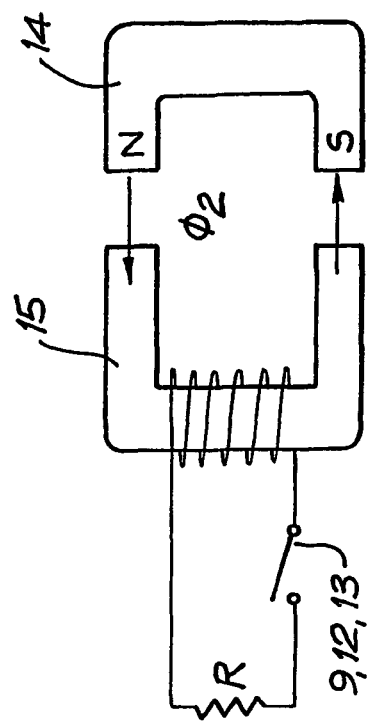
FIG. 3 is a diagram similar to FIG. 2 but illustrating the other half cycle of operation.
Figure 3:
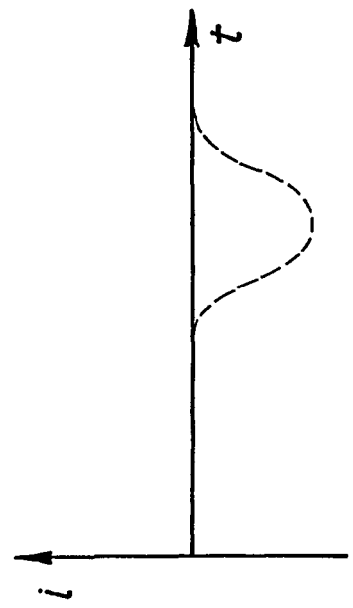

Turning now to FIGS. 2 and 3, the magnetic circuit formed by the core 15, magnet 14 and bridge 8 is schematically illustrated. Although the bridge 8 is very thin in the direction perpendicular to the plane of the disc 7, it has an appreciable extent in the plane of the disc 7 and thus a low reluctance. This is indicated in FIG. 2 by the bridge 8 being drawn larger than it would appear in cross-section.

When the bridge 8 is absents as illustrated in FIG. 3, the magnetomotive force of the magnet 14 causes a certain level of flux Φ2 to be present in the core 15. Because of the relatively large air gaps in the absence of the bridge 8, the magnetic circuit as illustrated in FIG. 3 has a relatively him reluctance. However, as seen in FIG. 2, with the bridge 8 shunting the core 15, a relatively low reluctance path is available from the north pole N to the south pole S of the magnet 14 via the bridge 8 and two relatively small air gaps. Thus essentially most of the magnetic flux firm the magnet 14 is present as flux Ø1 in the bridge 8. Almost no flux passes through the core 15.

Largely because of the change in air gap sizes, the reluctance of the magnetic circuit in the configuration illustration in FIG. 2 is less than the reluctance of the magnetic circuit in the configuration illustrated in FIG. 3. That is, Φ1 is larger than Φ2.

As a consequence, the magnetic potential energy of the circuit in the configuration of FIG. 2 is less than that of the circuit in the configuration illustrated in FIG. 3. This may be illustrated by gently spinning the disc 7 by hand. The disc 7 will come to rest (normally after a few oscillations as the disc 7 slows) with the bridge 8 positioned in line with the magnet 14 and core 15. That is, in the configuration illustrated in FIG. 2.

Expressed another way, as the bridge 8 approaches the magnet 14, the lower magnetic energy state of FIG. 2 will cause the bridge 8 to be drawn towards the magnet 14. Similarly, as the rotation continues and the bridge 8 moves away from the magnet 14 an effort is required to maintain the rotation as the higher magnetic potential energy state(s) are attained. For each revolution the effort of removing bridge 8 from the magnet 14 is substantially equal to the impetus gained by the disc 7 as the bridge 8 approaches the magnet 14.

As the bridge 8 approaches the magnet 14, defining a first half cycle, a steady flux Ø2 is in the core 15 and links the coil 16. As the bridge 8 progressively shunts the flux in the core 15, the magnetic field in the coil 16 collapses. Thus an electromotive force is generated in the coil 16. Since the coil 16 is connected to the load resistor R via the brushes 12, 13 and the track 9, a current flows in the coil 16 as illustrated in FIG. 2.

Conversely, as the bridge 8 moves away from the magnet 14, defining a second half cycle, at first there is a small amount of flux in the core 15, and the flux progressively increases to Ø2. Thus an electromotive force is generated in the coil 16. If the coil 16 were not open circuit, a current indicated by broken lines in FIG. 3 would flow (with reverse polarity to the current in FIG. 2). However, the brushes 12, 13 and track 9 are open circuit, so no current flows.

Thus, at this time, the disc 7 is only impeded by the attraction of the magnet 14 for the bridge 8. As a result, the impediment to continued rotation of the disc 7 is at a minimum and the efficiency of the generator 1 is increased.

The current flowing in the coil 16 generates an induced magnetic flux in the core 15 which increases the magnetic flux in the core 15. This induced magnetic flux increases with increasing speed of the disc 7. The speed of the disc 7 reaches a critical speed, at which the magnitude of the induced flux is equal to the magnitude of the flux supplied by the magnet 14. Thereafter, increasing speed causes increased induced flux in the core 15 and the device runs as a motor.

Figure 4:
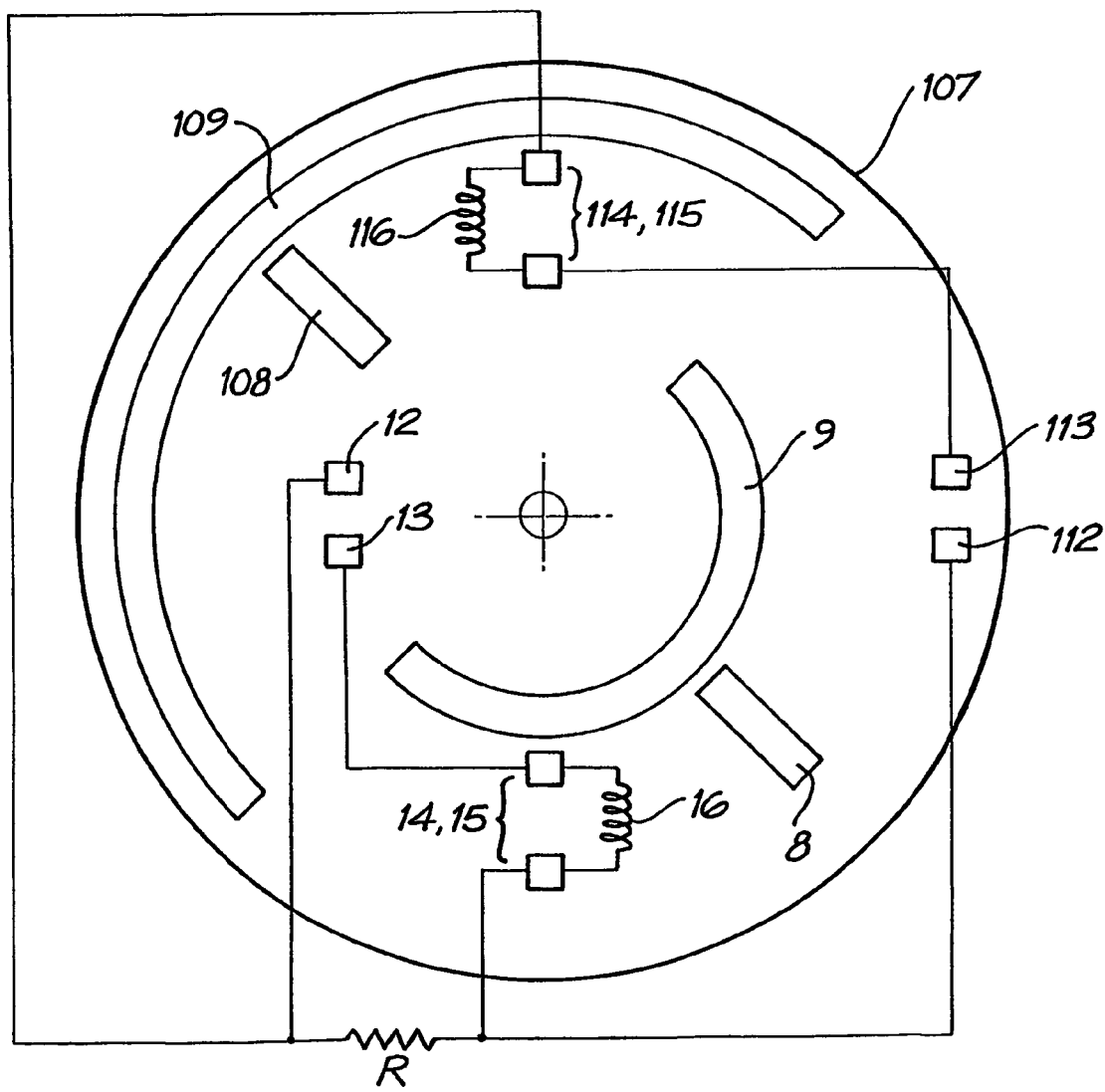
FIG. 4 is a plan view of the disc of a multi-coil machine.

It will be appreciated that the current generated by the arrangement in FIG. 1 is unidirectional in that current is generated only intermittently. However, with the duplicated arrangement, as illustrated in FIG. 4, two bridges 8, 108 are provided together with two tracks 9, 109, two pairs of brushes 12, 13 and 112, 113 and two pairs of coils 16, 116 each with its corresponding magnet (14, 114). Thus with the arrangement of the disc 107 of FIG. 4, two pulses are generated for each revolution of the disc 107. Depending upon the relative phasing of the coils 16, 116, the current supplied to the resistor R can be either 2 pulses of the same polarity (i.e. unidirectional current) or 2 pulses of opposite polarity (i.e. bi-directional current or AC).

That is, either DC current or single phase alternating current can be generated. By providing 3 discs 107 rotates by 120° to each other on the same shaft 4, three phase alternating current can be generated with the 3 resistors being connected in either Y or delta configuration as is well known to those skilled in the electric generating arts.

The foregoing describes only some embodiments of the present invention and modifications, obvious to those skilled in the art can be made thereto without departing from the present invention. For example, the permanent magnet(s) 14, 114 can be replaced by an electromagnet having a magnetic field generating current. The magnitude of the current generated or the speed of the motor, can be controlled by controlling the magnetic field of the device. For example, the field current of an electromagnet replacing magnet 14 can be controlled. Other ways of controlling the magnetic field include adjusting the size of air gaps in the magnetic circuit or other arrangements to adjust the reluctance of the magnetic path by, for example, changing the size of the core 15. Alternatively, a small winding can be wound about the magnet 14 to increase or decrease its magnetic field.

Furthermore, control can also be effected by utilizing a control resistor in series with the coil 16 instead of the open circuit as described above. As the resistance of such a control resistor is progressively decreased from an initial very high value, so the current generated, or motor speed, is decreased. Other control methods include electronically clipping the voltage in coil 16 and/or electronically controlling the current in coil 16.

Similarly, rather than use a mechanical switch in the form of tracks 9, 109 and brushes 12, 13, 112, 113, a solid state switch utilizing SCRs, thyristors, transistors, or even diodes can be employed. Such SCRs and thyristors can be triggered by stationary sensing coils in which trigger currents can be generated by small auxiliary magnets carried by the discs 7, 107. Also rather than a closed circuit/open circuit being used as the switch means, a low resistance/high resistance circuit can be used instead.

Finally, although the disc 7, 107 is preferably rote in one direction as described above, it will be apparent to those skilled in the art that the disc 7, 107 can be oscillated (as indicated by the broken line arrow in FIG. 1) rather than rotated. In one such embodiment, the stationary end point of the oscillation would see the bridge 8 fully inserted between the magnet 14 and core 15.

The tern "comprising" (and its grammatical variants thereof) is used in the inclusive sense of "having" or "including" and not in the exclusive sense of "consisting only of".

The invention claimed is:

1. A method of generating an electric current, said method comprising the steps of:
   1, creating a magnetic field extending from a first magnetic pole to a second magnetic pole,
   2, creating a first magnetically permeable path extending from adjacent said first magnetic pole to adjacent said second magnetic pole,
   3, winding a coil about said first magnetic path,
   4, connecting an electrical load across said coil,
   5, connecting a switch means in series with said coil,
   6, enabling a second magnetically permeable path to move relative to said pole into a position between said first and second magnetic poles to shunt said first magnetic path,
   7, moving said second magnetically permeable path relative to said poles out of said position between said first and second magnetic poles, and 8, opening and closing said switch means so that said switch means is closed when said second magnetic path is moving into said position and opened when said second magnetic path is moving out of said position.

2. The method as claimed in claim 1 including the step of rotating said second magnetic path.

3. The method as claimed in claim 2 wherein the rotation of said second magnetic path is arcuate.

4. The method as claimed in claim 3 wherein the rotation of said second magnetic path is circular.

5. The method as claimed in claim 2 wherein said switch means is mechanical and said method includes the step of operating said switch means in synchronism with said rotation of said second magnetic path.

6. The method as claimed in claim 1 and including a plurality of coils.

7. The method as claimed in claim 6 wherein for each coil a corresponding magnetic field and corresponding second magnetically permeable path are provided.

8. The method as claimed in claim 7 wherein the electric current generated is bi-directional.

9. The method as claimed in claim 1 wherein the electric current generated is unidirectional.

10. The method as claimed in claim 1 wherein said relative movement of said second magnetic path is oscillatory.

11. A method as claimed in claim 1 wherein said switch means is electronic.

12. A method as claimed in claim 11 wherein said electronic switch means is selected from the group consisting of SCRs, thyristors, transistors and diodes.

13. A method as claimed in any one of claims 1-12 wherein opening said switch means creates a high resistance circuit and closing said switch means creates a low resistance circuit.

14. An electrical device comprising a magnetic field means having first and second magnetic poles between which a magnetic field extends, a first magnetically permeable path carrying a coil and extending from adjacent said first magnetic pole to adjacent said second magnetic pole, and switch means connected in series with said coil, a second magnetically permeable path mounted for movement relative to said poles into and out of a position between said first and second magnetic poles in which said second path shunts said first path, and means to close said switch means as said second path moves towards said position and open said switch means as said second path moves out of said position.

15. The device as claimed in claim 14 wherein said second path is rotatably mounted.

16. The device as claimed in claim 15 wherein said rotation is arcuate.

17. The device as claimed in claim 16 wherein said rotation is circular.

18. The device as claimed in any one of claims 14-17 wherein said switch means is mechanical and operable in synchronism with said movement of said second magnetic path.

19. The device as claimed in any one of claims 14-17 wherein said switch means is electronic.

20. The device as claimed in claim 19 wherein said switch means is selected from the group consisting of SCRs, thyristors, transistors and diodes.

21. The device as claimed in any one of claims-14-17 wherein said switch means is switched between high resistance and low resistance states.

22. The device as claimed in claim 14 and including a plurality of coils.

23. The device as claimed in claim 22 and having for each coil a corresponding magnetic field, means and a corresponding second magnetically permeable path.

24. The device as claimed in claim 23 wherein the electric current generated is bi-directional.

25. The device as claimed in claim 14 wherein the electric current generated is unidirectional.

26. The device as claimed in claim 14 wherein the movement of said second magnetically permeable path is oscillatory.

27. The device as claimed in claim 14 and comprising an electric generator and having an electrical load connected in series with said coil.

28. The device as claimed in claim 14 and comprising an electric motor.

* * * * *